United States Patent
Theobald

(10) Patent No.: US 8,875,994 B2
(45) Date of Patent: Nov. 4, 2014

(54) PAYMENT INTERFACE

(71) Applicant: MEI, Inc., Malvern, PA (US)

(72) Inventor: Paul Theobald, Pitstone (GB)

(73) Assignee: MEI, Inc., Malvern, PA (US)

( * ) Notice: Subject to any disclaimer, the term of this patent is extended or adjusted under 35 U.S.C. 154(b) by 8 days.

(21) Appl. No.: 13/887,912

(22) Filed: May 6, 2013

(65) Prior Publication Data

US 2013/0299574 A1 Nov. 14, 2013

Related U.S. Application Data

(60) Provisional application No. 61/644,219, filed on May 8, 2012.

(51) Int. Cl.
| | |
|---|---|
| *G07F 19/00* | (2006.01) |
| *G06K 7/00* | (2006.01) |
| *G06K 13/07* | (2006.01) |
| *G06Q 20/34* | (2012.01) |
| *G07F 7/08* | (2006.01) |

(52) U.S. Cl.
CPC ............. *G06K 7/0004* (2013.01); *G06K 13/07* (2013.01); *G06Q 20/34* (2013.01); *G07F 7/088* (2013.01)
USPC ........................................................ 235/379

(58) Field of Classification Search
USPC ......................................... 235/379, 380, 440
See application file for complete search history.

(56) References Cited

U.S. PATENT DOCUMENTS

| | | | |
|---|---|---|---|
| 3,761,683 A * | 9/1973 | Rogers .......................... 340/5.25 |
| 5,317,138 A | 5/1994 | Togawa | |
| 6,164,538 A * | 12/2000 | Furuya et al. ................. 235/449 |
| 7,493,437 B1 | 2/2009 | Jones et al. | |
| 7,584,885 B1 | 9/2009 | Douglass | |
| 7,946,477 B1 | 5/2011 | Ramachandran et al. | |
| 7,975,912 B2 * | 7/2011 | Weston ......................... 235/380 |
| 8,157,171 B2 * | 4/2012 | Ikeda ............................ 235/440 |
| 2003/0095386 A1 | 5/2003 | Le et al. | |
| 2005/0119979 A1 | 6/2005 | Murashita et al. | |
| 2006/0213989 A1 | 9/2006 | Ahmadi et al. | |
| 2007/0175983 A1 * | 8/2007 | Klug ............................. 235/380 |

FOREIGN PATENT DOCUMENTS

| | | |
|---|---|---|
| DE | 3505130 A1 | 8/1986 |
| DE | 4107544 A1 | 9/1991 |
| EP | 0357827 A1 | 3/1990 |
| EP | 0587488 A1 | 3/1994 |
| EP | 0712087 B1 | 9/2001 |
| EP | 1457919 A1 | 9/2004 |
| JP | 2005128680 A | 5/2005 |
| WO | WO-9746964 A1 | 12/1997 |
| WO | WO-2012018634 A1 | 2/2012 |

OTHER PUBLICATIONS

"Hybrid Card Reader." *IBM Technical Disclosure Bulletin.* 38.10(1995):159-161.

* cited by examiner

*Primary Examiner* — Jamara Franklin
(74) *Attorney, Agent, or Firm* — Mintz Levin Cohn Ferris Glovsky and Popeo, P.C.

(57) ABSTRACT

A payment interface apparatus, system and method is disclosed. In particular, a payment interface apparatus for use in vending machines, gaming machines, or other, typically unattended machines that accept payments via a variety of payment methods is disclosed. Also disclosed is a system and method for determining and processing a transaction as a particular transaction type based upon the type of media used on a standardized financial transaction card. The interface apparatus includes a plurality of sensors to read one or a plurality of media on a single standardized financial transaction card in a single presentation of the card.

20 Claims, 19 Drawing Sheets

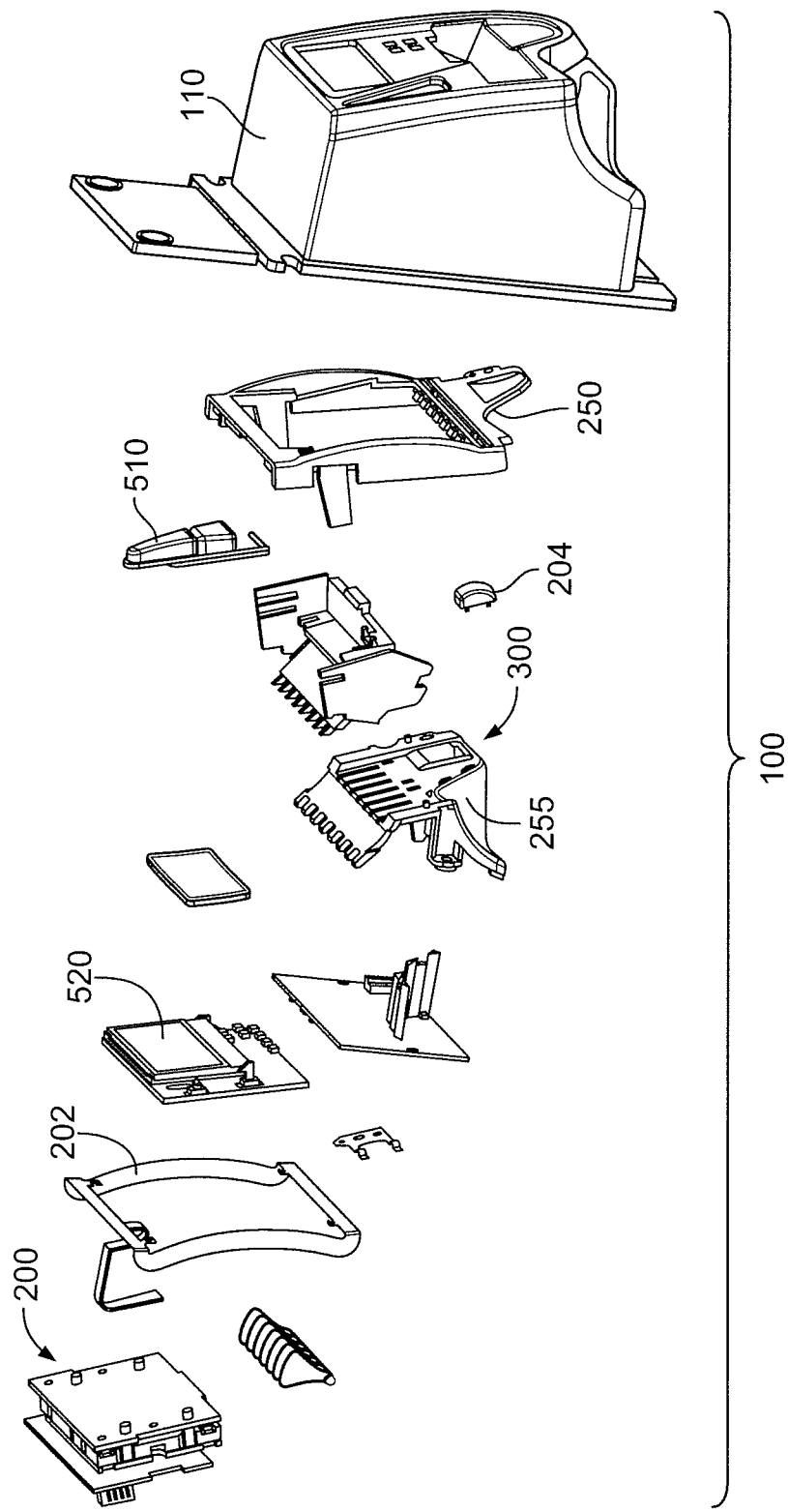

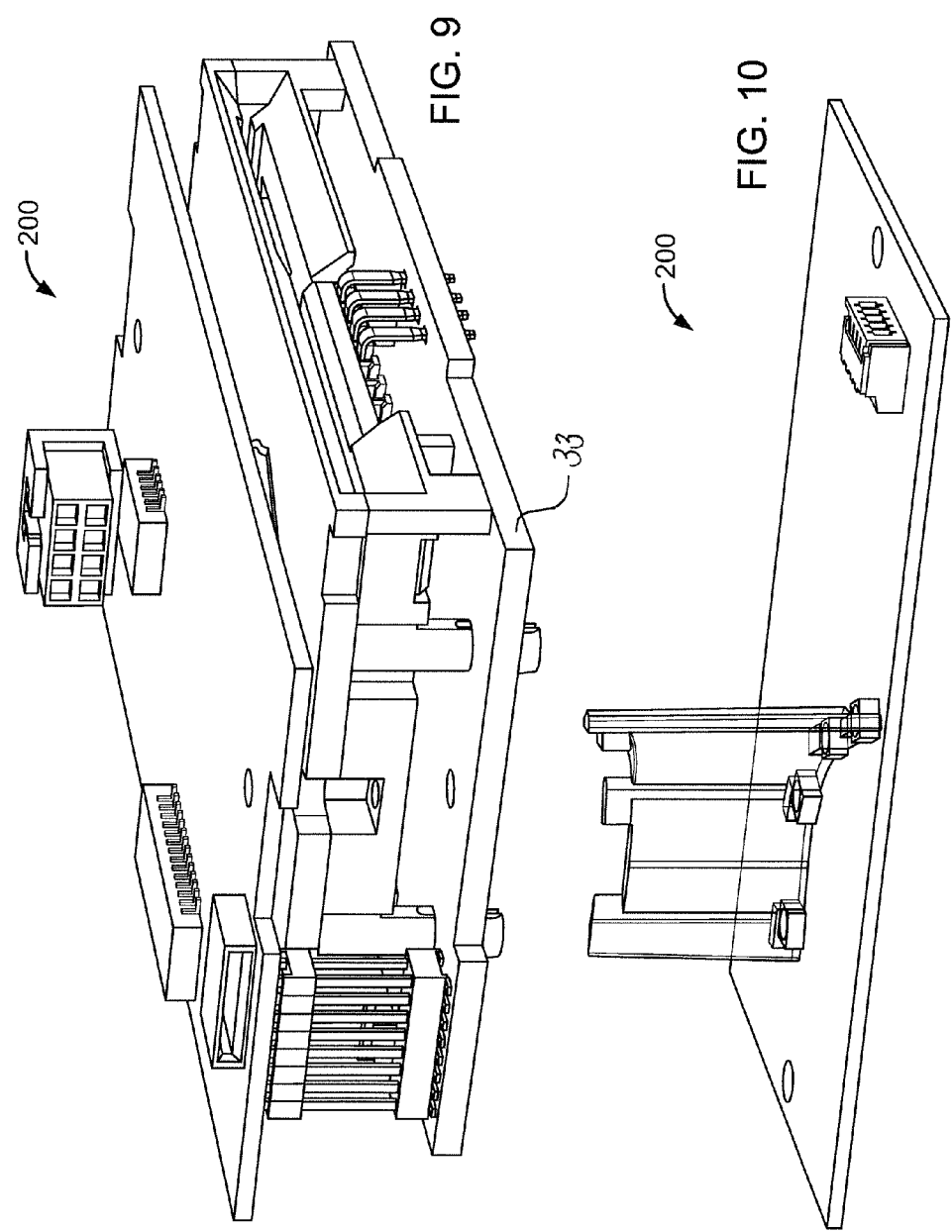

PAYMENT INTERFACE

RELATED APPLICATIONS

This application claims priority to U.S. Provisional Patent Application No. 61/644,219 filed May 8, 2012, the content of which is hereby incorporated by reference in its entirety.

FIELD

This application relates generally to payment interface apparatus. In particular, this application relates to payment interface apparatus for use in vending machines, gaming machines, or other machines, typically unattended that accept payments via a variety of payment methods.

BACKGROUND

Various markets throughout the world use various money handling apparatus in, typically unattended, transaction machines, such as vending machines, gaming machines, etc. In addition to, and in some cases to the exclusion of, paper money and coins, many of these machines are or will accept standard financial transaction cards, such as credit cards, bank cards, gifts cards, etc. Throughout the world, there are several safety and security features used on such cards, with some being more widely used in certain geo-political areas than others.

In America, for example, the magnetic stripe is prevalent, with increasing use of contact or contactless technologies. In Europe, these technologies are also available, as is an integrated circuit or smart card. In Australia, an EMV contactless system is popular.

With an increasingly global world, it would be beneficial to have a single user interface that could accept, locate, and analyze multiple of these safety/security features, and, perhaps use such information to enhance the customer experience and/or determine how the transaction is handled or processed.

BRIEF DESCRIPTION OF THE DRAWINGS

The drawings submitted herewith show some embodiments or features of some embodiments encompassed by the disclosure. The drawings are meant to be illustrative and are not intended to be limiting. Like reference numeral refer to like elements through the drawings.

FIGS. 6-10 are various views of a bezel or terminal in accordance with some embodiments disclosed herein.

DETAILED DESCRIPTION

Figure 1:
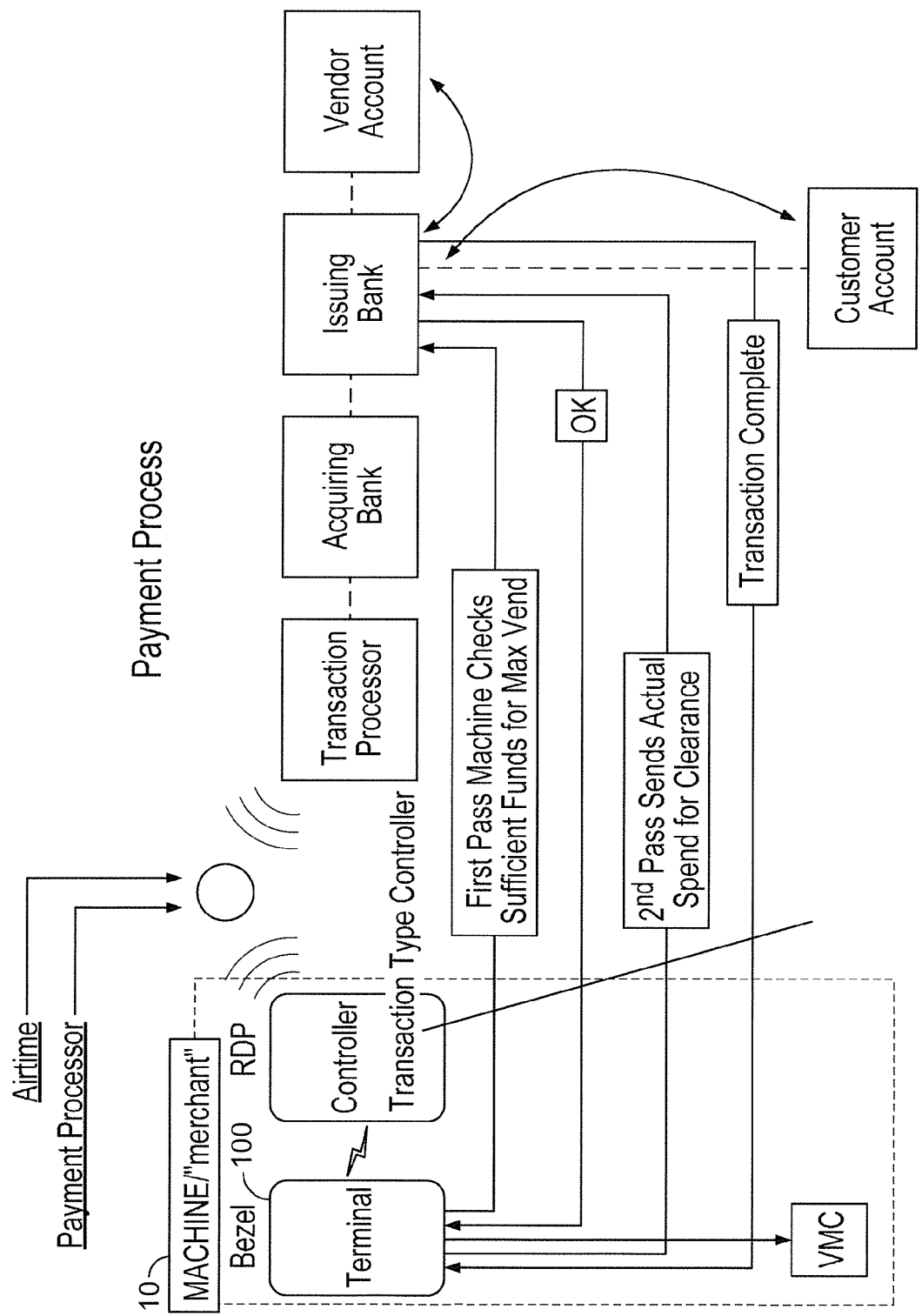
FIG. 1 is a schematic illustrating an exemplary payment process.

As noted above, with the complexity and number of standardized financial transaction cards and safety/security features on them, a unified customer experience will enhance the customer experience. Using the information could also allow machine owners or operators to maximize profits or otherwise control the type of transaction used to achieve the best fee profile.

A user payment interface as disclosed herein will allow consumers to make a debit or credit based vend regardless of the technology in the bank card or mobile device they have. In most instances, the vend will occur with a single pass of the bank card (standardized financial transaction card). To ensure, success, the user payment device should be intuitive and encourage consumers to use credit and debit cards. The payment process should be consistent across all card types and be instinctive to the consumer.

In some embodiments, the user payment interface comprises a bezel which can be fit with a bill acceptor or not, could be new or retrofitted into existing machines.

The bezel (or terminal) can manage the complexity of the various card types and technologies that exist already as well as new technologies that are being developed. The bezel will include at least one reader (media sensor) compatible with the various magnetic stripe, chip and contactless payment schemes in the US, Canada, Europe and Australia, and any other desired financial system.

The disclosure herein relates to a payment interface system, including the payment interface apparatus (e.g. bezel, terminal, etc.) and a transaction type controller, the payment interface apparatus itself, the transaction type controller itself, and methods of using them.

To better understand the system and its parts, it is helpful to have an understanding of card and sensor types, transaction types, and the electronic payment process.

General Industry Standards for the Different Card Interface Formats.

The devices and methods of the present invention described herein are useful for either employing a credit card or a debit card, or other standardized financial transaction card. Generally, the transaction card has at least a magnetic strip on its surface that may be swiped at a POS terminal to complete a transaction for payment for a good or service. The methods of such a transaction are typically within the ISO/IEC 7810 standard which defines the dimensions as 8.560× 5.98 millimeters. All standardized dimensions typically have a thickness of 0.76 for a card. Some transaction cards may be imbedded with a hologram to avoid counterfeiting.

A smart card may also be known as a chip card or an integrated circuit card. A smart card is well known in the art and has an imbedded integrated circuit which can process information. A smart card can receive an input which is processed by way of the integrated circuit or chip with an application based on it and then deliver an output. A contact smart card has a contact area comprised of several gold-plated contact pads that is about a centimeter square. When the contact smart card is inserted into a reader that makes contact with electrical connectors that can read information from the chip and write information back. A typical smart card follows the dimensions of ISO/IEC 7810 which determines the dimensions of the card and ISO/IEC 7816 which defines the physical location and electrical characteristics of the chip. Contact smart cards typically do not contain batteries and the energy is supplied by the card reader for functions that are done on the chip. Contact smart cards typically have standard communication protocols so that a smart card may be used in different readers and transactions can be completed. Contact smart cards are used as communication medium between a smart card and a host, and such host may be a computer, a POS terminal, a mobile phone, a transit entry point, a public phone, and the like.

Another type of smart card is known as a contactless smartcard. A contactless smartcard contains a chip that communicates with a card reader through RFID induction technology, or other contactless technology. A contactless smartcard requires only proximity to an antenna to complete the transaction. A contactless smartcard is typically defined by the dimensions of a standard transaction card, for example, ISO/IEC 7816, and will have a standardized communication protocol, for example as defined by ISO/IEC 1443. Typically, a contactless smartcard may be in communication at distances of up to ten centimeters. A standard for contactless smartcard is ISO/IEC 15693 which allows communication at distances up to 50 centimeters. Other standards may be available at larger distances for applications such as mass transit and toll roads.

A smartcard may have more than one technology on it. For example, a smart card may have a magnetic strip and a chip. A smart card may have a magnetic strip, a chip and a contactless interface all on one card. A smart card may have a chip and a contactless interface on one card. Sometimes a smart card having a magnetic strip and at least a chip may be known as a hybrid smart card. The devices and methods of the present invention described herein are useful with a card having any or all of these media types.

IC Card Reader Example

Figure 23:
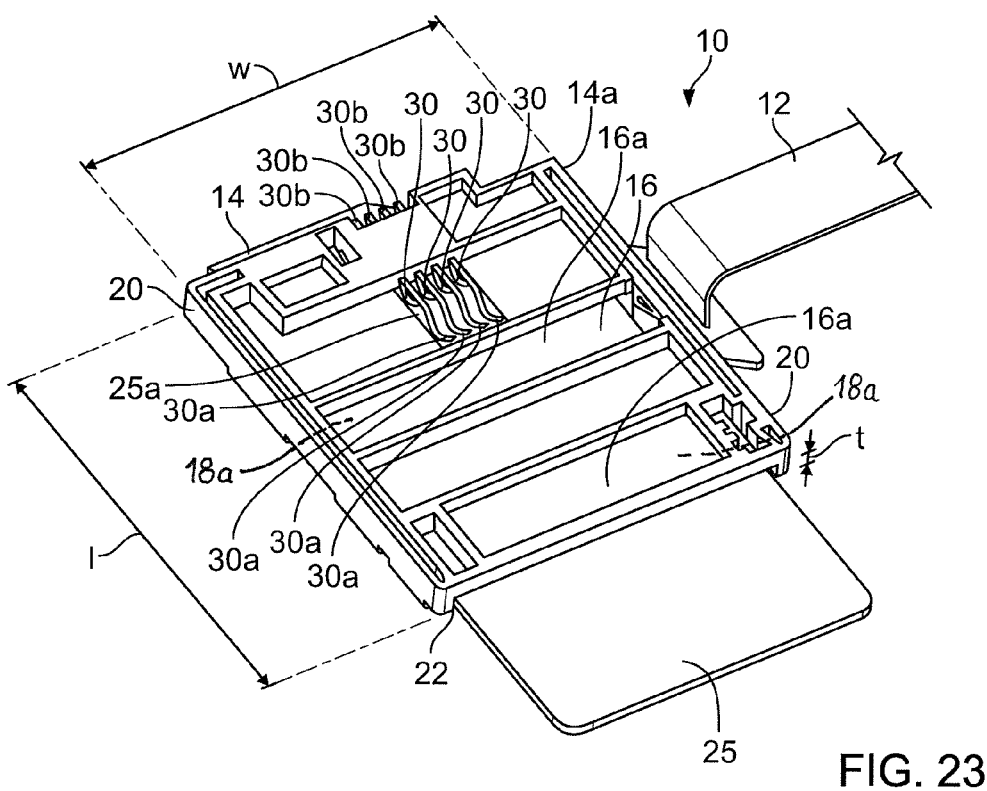
FIG. 23 illustrates an exemplary integrated chip reader for use in accordance with some embodiments disclosed herein.

As further shown in FIG. 23, an exemplary IC (chip) card reader is disclosed. A plurality of signal contacts 30 are positioned within a rearward portion 14a of housing 14 opposite a slot ingress 22a. Contacts 30 protrude from the rearward portion 14a and extend normal relative to a plane in which slot 22 is defined. Each of contacts 30 includes a deflectable spring-like interior extent 30 a for wiping engagement with contact pads 25a defined on a surface of card 25 and an exterior extent 30b having a tail portion for termination with a PCB such as flexible PCB 33 (shown in FIG. 9). As card 25 is linearly inserted into slot 22 and toward rearward portion 14a, spring-like portions 30a come into sliding engagement with contact pad 25a of card 25 so as to clean dirt and debris therefrom. A similar wiping action is experienced by card 25 upon retraction of the card from slot 22 after completion of a card reading operation.

Unlike connectors utilizing a base and cover combination, connector 10 can simply accept a smart card 25 in slot 22. It is important that the surface of card 25 having contact pad 25a thereon is face up in relation to upper surface 16 of housing 14 so as to align contact portions 30a with contact pad 25a. Guides 16a and 18a (below card 25) cooperate to maintain the planar insertion path of card 25 until engagement of contact pad 25a initiates a card reading operation. It is further noted that the housing may support one or more switching contacts (not shown) as is conventionally known, so as to provide an indication of proper card insertion and further initiate a card reading operation.

Those of skill in the art will be aware of other suitable card reader designs.

The Payment Process

FIG. 1 illustrates a flowchart of an exemplary payment system and process. A standardized transaction card is presented at a merchant (e.g. vending machine 10), credit card data is transferred to the controller, which then transmits the data to an outside transaction processor which handles information from the various banks, the merchant account, and the customer account.

Payment Process

When using a credit or debit card outside of a vending type situation, with the notable exception of gasoline (petrol) stations, in most retail applications (e.g. shops, bars, hotels, etc.) you pay with your credit or debit card after the bill has been presented, in exactly the same way as cash. If the consumer's card can handle both debit & credit payments the retail terminal will normally, but not always, give the consumer the choice of which transaction to use.

Unattended point of sale applications (e.g. vending, etc.) typically handle the payment the other way round, the cash is presented first and then the selection is made. This presents unique challenges if the consumer experience is to be consistent when paying with cash or card or mobile phone, or other cashless device.

If the consumer's card can handle both debit and credit payments the unattended point of sale typically does not offer a choice, the transaction is simply processed on the default transaction set up on the card.

To add to the complexity, debit, credit and other standardized bank cards may use a security feature, and often, more than one, in turn, some of these involve online payment methods and some do not.

Magnetic Stripe and Chip (Both Debit & Credit) and US Contactless.

Magnetic stripe and Chip and US contactless transactions are on-line because there is no value stored on the card. Some contactless type transaction, e.g. Paypass, Paywave and Expresspay, emulate a magnetic card swipe. The authorization happens in real time but the clearance (settlement) can be done as a batch at a later stage. There are two ways this is handled in the US: pre-authorization or via an open-connection.

With pre-authorization, the card is presented to the terminal at the merchant and card info passes to the controller. The controller communicates with the machine or tills to determine transaction value. The transaction value is then sent to the transaction processor for authorization. The transaction processor routes the request for authorization through the acquiring bank. The acquiring bank contacts the bank that issued the card. The issuing bank check the cardholder account to confirm funds are available. The answer is routed back to the merchant. If the authorization is given the payment is confirmed and passes back through the same route to the issuing bank. The issuing bank then transfers the money from the cardholders account to the merchant account. This, of course, is all handled in relatively short time via the passing of electronic data via to and among the various systems and processors involved.

The value authorized does not have to match the payment made. For example, a restaurant may process authorization for the price of food but add any gratuity to the final settlement. Petrol stations typically pre-approve to a higher amount and then adjust to the amount of fuel actually purchased.

In open connection systems, when the card is presented either by swiping or tapping the controller opens the connection with the transaction processor. The consumer is prompted to "Make Selection." The actual vend price is authorized. The connection remains open on multi vend machines for a configurable period of time.

Online/Offline prepaid and Non-US contactless systems may pre-paid cards in addition to online authorizations. Prepaid cards have stored value on the card.

EMV Contactless cards are loaded with available funds in the form of secure value credits which are decremented during the transaction and only become money when they are spent. Prepaid cards have no need to go online. Contactless, such as EMV, typically go online either to process payment or to occasionally check on the card status. Because the value is stored on the card there is no pre-authorization required other than for the controller to confirm there are sufficient credits to make the purchase. Once the transaction is made the credits (payment) is processed in the same way as an online transaction but because the value is already authorized this does not necessarily have to be done in real time. Transactions can be batched up to reduce transaction fees.

Thus, we see that depending the card type and payment path is often associated with the type of media used to store the credit card data. Media type includes, but is not limited to magnetic stripe, chip, contactless, and others. Many cards employ one or more media types. The media type translates, as discussed above into a transaction type (online, offline, etc.)

The airtime provider, transaction processor and acquiring bank all make a charge for handling both the authorization and the payment. The charges vary dependent on the transaction type. Currently, magnetic stripe transactions are the most expensive and paid as a % per transaction. Chip is next, also a % of the transaction. Contactless is the cheapest and has been quoted as a fixed payment per transaction/batch. Not surprisingly, in some instances, the financial institutions tie higher fees to less secure transactions. Additionally, actual charges are paid by the merchant and rates vary enormously dependent on the negotiation power of the merchant. Thus, it can be seen that a payment interface system that recognizes all media types and all transaction types and allows the owner/operator to establish the most favorable transaction type would be of interest. On the other hand, the payment interface, to be most effective, must be intuitive and consistent for users from one location to another.

Accordingly, a single payment interface device (bezel, terminal) has been designed to sense and read data present on multiple media types on a single card. Particularly, the device is designed such that inserting a card into a single slot will facilitate reading of multiple card types on the card.

A payment interface system comprising:
a. a user interface further comprising:
i. a housing,
ii. a plurality of media sensors for sensing card data and media type, the plurality of media sensors each being selected to read a different media type,
iii. a singular card path for guiding a standardized financial transaction card having card data stored on at least one media type,
each media sensor is positioned and located within the housing and along the singular card path such that user action of inserting a standardized financial transaction card into and along the singular card path places each media type present on the card in operative communication with a corresponding media sensor,
and
b. a transaction type controller further comprising:
i. a memory for housing a set of stored instructions regarding determining a desired transaction type to present for payment based on media type, when multiple media types are present in a single standardized financial transaction card,
ii. a processor in communication with the plurality of media sensors for obtaining card data and media type and for implementing the stored instructions to determine the desired transaction type based on available media types on the standardized financial transaction card and the stored instructions, and capable of communicating the desired transaction type along with card data to a payment controller.

The media type may be any media type suitable for inputting, storing, outputting, and updating data on a standardized financial transaction card. The media type can be, but is not limited to magnetic stripes, integrated chips, integrated chips and pins, RF devices, and near field communication (NFC) devices.

Accordingly, the media sensors may be any suitable media sensor appropriate for sensing media types found in standardized financial transaction card. For example, suitable media sensors include, but are not limited to, magnetic stripe readers, chip readers, chip and pin readers, contactless readers, prepaid card readers, RF readers, and near field communication (NFC) readers, etc.

In some embodiments, at least one of said plurality of media sensors is a contact or contactless reader positioned such that contact or contactless media may be read when in operative proximity of the housing without entering the single card slot and path. In this manner, a single interface could accept a card in its card slot, but also accommodate contact or contactless use without the slot. This arrangement would also allow use of a non-card (e.g. smartphone) outfitted with appropriate contact or contactless technology.

It should be appreciated that from time to time, it may be beneficial for the user interface to communicate with the user. Any suitable communication device or combination can be used. For example, video and/or audio cues may be provided to the user. As such, the interface could be provided with a display device, an audio device or combination thereof.

Although this discussion concentrates on preparation of a cashless device, it should be appreciated that the device could also be configured for use with cash and coin based systems as well. Thus, in some embodiments, the payment interface device may also be provided with a bill acceptor. In some embodiments, the bill acceptor can be positioned at a top height, a lower height or a mid-height position. As illustrated in FIGS. 2-10, at the mid height position the bill path may cross the singular credit card path. This situation allows for space savings, which is important in vending operations. In this case, the bill acceptor defines a slot therethrough for allowing a card to pass therethrough. In some embodiments, the bill acceptor may employ a shutter or other system to minimize bills catching on the slot. Other designs and positions are possible, both with and without cross-over between the bill path and the card path.

Figure 22:
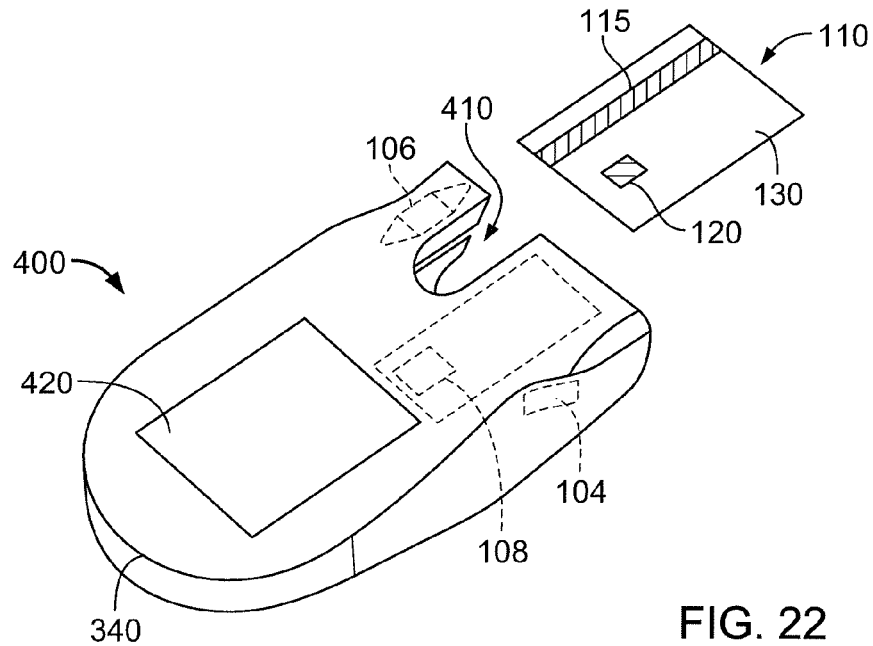
FIG. 22 illustrates an exemplary stand alone card reader for use in accordance with some embodiments disclosed herein.

It should also be noted that although the focus of this disclosure has been on apparatus systems and methods placed in a vending machine, similar systems could be established outside of a vending machine, for example in a handheld card reader that might be useful for example at stadium events or anywhere where a non-vending credit card authorization may be needed. For example, as part of a POS register, a separate POS credit card processor, or as a handheld POS device (such as exemplified in FIG. 22). Some embodiments of such device include a plurality of media sensors in communication with the transaction type processor for determining which transaction type to pass along to the controller and ultimately to the transaction processor and various banks. The transaction type controller may be the same as or different from the controller. All communications may be wired or wireless, or a combination thereof.

Additionally, to facilitate user satisfaction, the interface may employ a user input device, which could be as simple as a single key, multiple keys, or even a touch screen, etc.

In some embodiments, a payment interface system comprises:
- a. a user interface (e.g. bezel/terminal) further comprising:
    - i. a housing, defining a single card slot and single card path for accepting a standardized financial transaction card having card data stored on at least one media type,
    - ii. a plurality of media sensors, for sensing card data and media type, each media sensor is positioned and located within the housing such that user action of inserting a standardized financial transaction card into the single card slot and along the single card path, places each media type present on the card in operative communication with a corresponding media sensor, the plurality of media sensors are each selected from a different media type, said media type selected from magnetic stripe readers, chip readers, chip and pin readers, contactless readers, prepaid card readers, RF readers, and near field communication (NFC) readers, wherein any contact or contactless reader is also positioned such that contact or contactless media may be read when in operative proximity of the housing without entering the single card slot and path;
    - iii. a communication device for communicating with the user,
        wherein the communication device is a display device, an audio device or combination thereof,
    - iv. a bill acceptor;
    - v. a user input device (i.e. one or more keys); and
- b. a media type controller further comprising:
    - i. a memory for housing a set of stored instructions regarding determining a desired media type to present for payment when multiple media types are present in a single standardized financial transaction card,
    - ii. a processor in communication with the plurality of media sensors for implementing the stored instructions to determine the desired media type based on available media types on the standardized financial transaction card and the stored instructions and capable of communicating the desired media type to a payment controller.

As alluded to above, the various parts of the system are important in and of themselves. A user interface for a payment interface system comprises:
a housing,
a plurality of media sensors for sensing card data and media type, the plurality of media sensors each being selected to read a different media type,
a singular card path for guiding a standardized financial transaction card having card data stored on at least one media type,
each media sensor is positioned and located within the housing and along the singular card path such that user action of inserting a standardized financial transaction card into and along the singular card path places each media type present on the card in operative communication with a corresponding media sensor.

As noted above, the media sensors are selected from magnetic stripe readers, chip readers, chip and pin readers, contactless readers, prepaid card readers, RF readers, and near field communication (NFC) readers, In some embodiments, at least one of said plurality of media sensors is a contact or contactless reader positioned such that contact or contactless media may be read when in operative proximity of the housing without entering the single card slot and path. As shown throughout the figures, some embodiments provide a landing pad 210 against which or close to which the user may place the card (or other device) for contactless transactions. In some embodiments, standard or universal symbols can be used to inform the user of the location of the landing pad 210.

In some embodiments, a communication device for communicating with the user, such as a display device, an audio device or combination thereof, may be provided.

In some embodiments, a bill acceptor may be provided.

Some embodiments may employ a user input device (e.g. one or more keys).

In addition to the payment interface, a transaction type controller can be employed. The transaction controller may be separate from the user interface, and in some embodiment is coupled to the interface so as to allow the two to be separate for best use of space within the vending machine. The transaction type controller may also be integral with or separate from the transaction processor.

A transaction type controller for a payment interface system, comprises:
a memory for housing a set of stored instructions regarding determining a desired transaction type to present for payment based on media type, when multiple media types are present in a single standardized financial transaction card,
a processor in communication with the plurality of media sensors for obtaining card data and media type and for implementing the stored instructions to determine the desired transaction type based on available media types on the standardized financial transaction card and the stored instructions, and capable of communicating the desired transaction type along with card data to a payment controller.

The stored instructions will typically include some kind of ranking or hierarchy establishing an order of preference based on the media type and/or security features on the card. As noted above, currently, magnetic stripes are thought to be the least secure, and in market where card are available with other security features, the financial institutions charge more for transactions based on magnetic stripe cards. Thus, upon detecting, for example, both a magnetic stripe and a contactless technology, the instruction could be written to process the card using its contactless technology, thereby generating less fees for the merchant, and therefore more profits.

Those of skill in the art will readily recognize that any desired hierarchy could be established, and programmed into the system. Such updates could be owner updated, or loaded onto the machine at manufacture or installation.

Thus, the transaction type controller is useful in assess, based on data received from the sensors in the interface, what type of media is available, and accordingly which transaction types are available, and ultimately under which transaction type the transaction will occur—essentially, before the financial institutions become aware of the vend.

Figure 2:
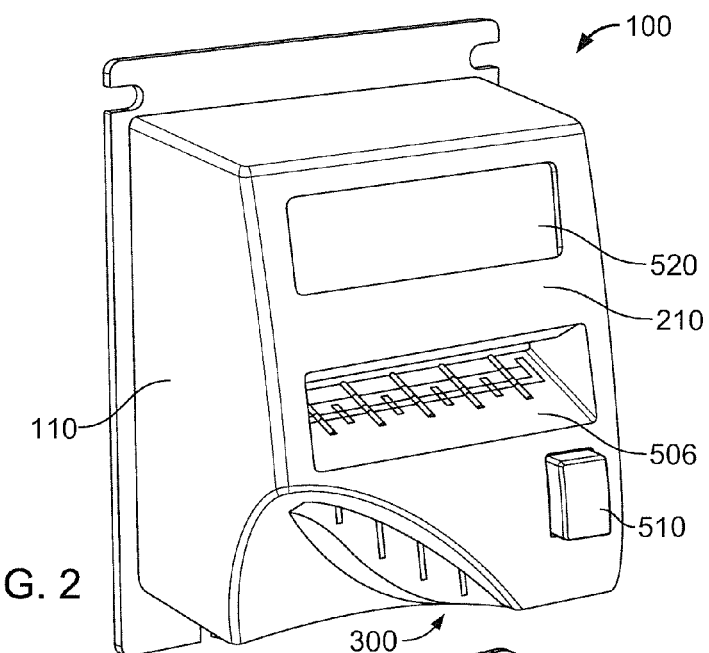
FIG. 2 is a perspective view of a bezel or terminal in accordance with some embodiments disclosed herein.
Figure 3:
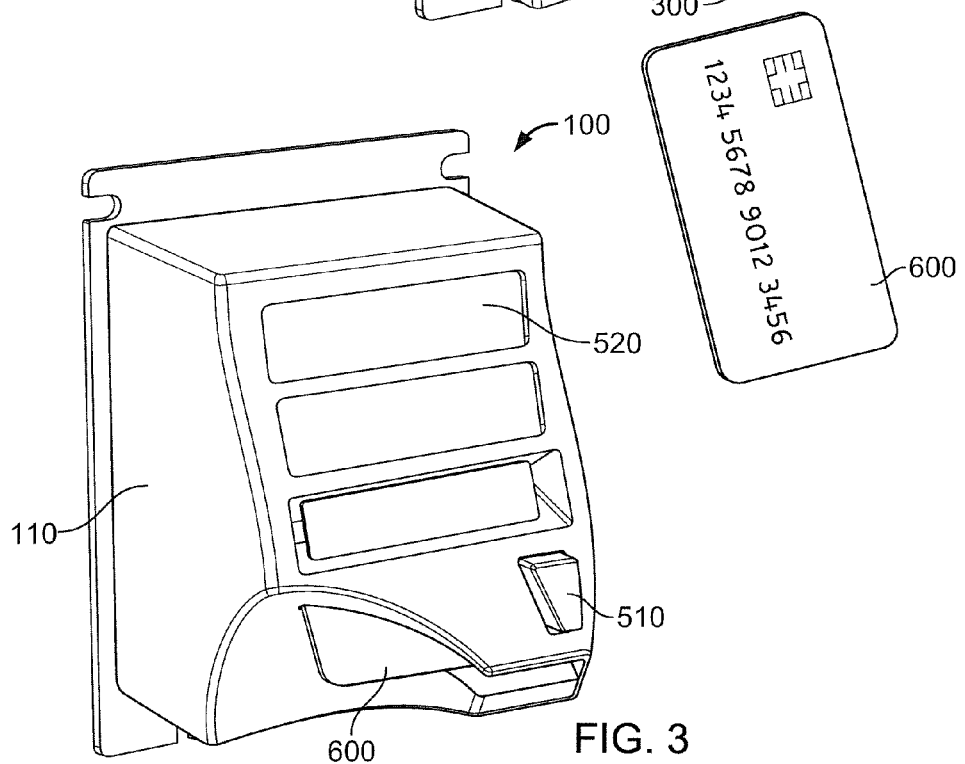
FIG. 3 is a perspective view of a bezel or terminal in accordance with some embodiments disclosed herein.
Figure 4:
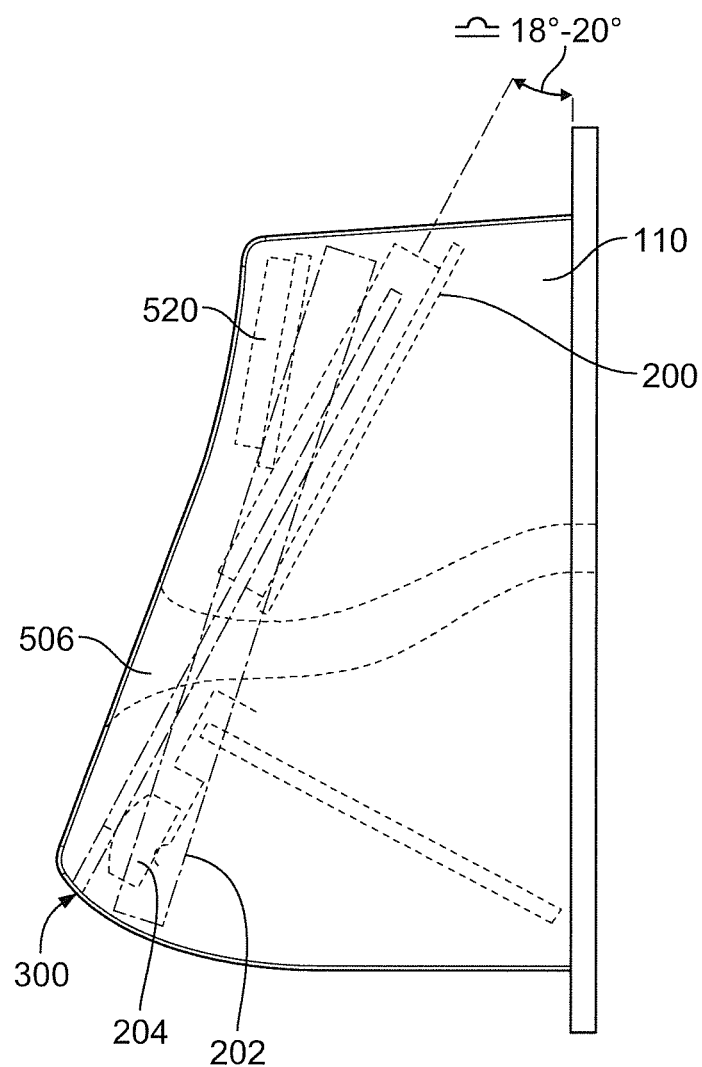
FIG. 4 is a cross-sectional view of a bezel or terminal in accordance with some embodiments disclosed herein.

With reference to the figures, FIGS. 2-4 illustrate an exemplary bezel or terminal (user interface) as disclosed herein. The bezel 100 includes a housing 110, which supports various media sensors (e.g. contact reader 200, antenna 202, swipe reader 204), and defines a singular card path 300. The device, as shown, includes a bill acceptor 506 and defines a bill path that crosses the card path 300. The device also has a display 520, an interactive button 510, and a landing pad 210 for sensing contactless media on a card or other device. The card 600 is inserted into the card path 300 wherein upon insertion all media on the card can be read or sensed by the various sensors. With information passed on to the transaction type controller, as discussed elsewhere.

Figure 5:
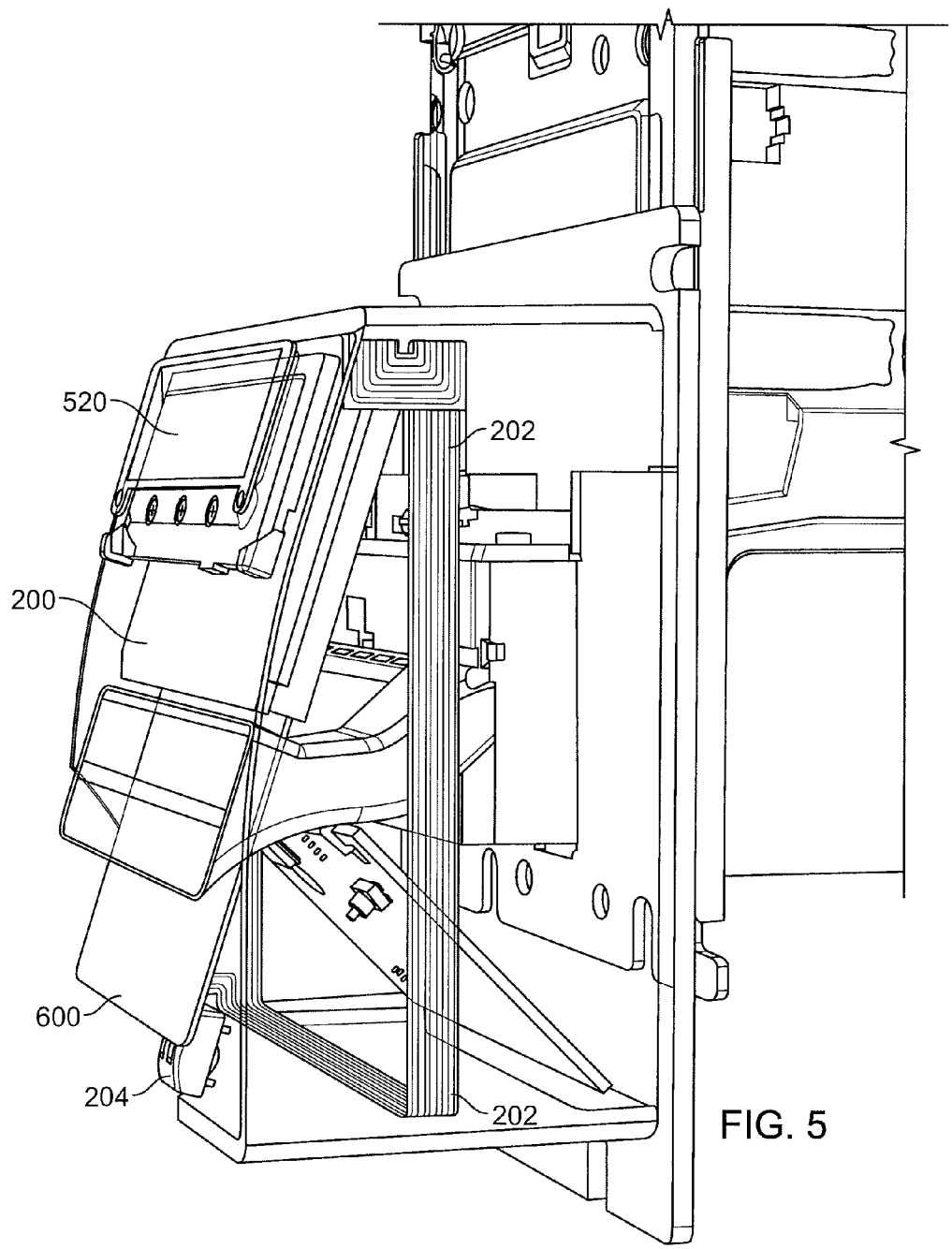
FIG. 5 is a cross-sectional perspective view of a bezel or terminal in accordance with some embodiments disclosed herein.

FIG. 5 shows a cut away view with a card inserted. It is readily seen that a card in this position can be or has been read or sensed by each of the sensors.

FIGS. 6-10 show various views of an exemplary bezel.

FIGS. 11A-12B show alternative geometries where the bill path and the card path cross, essentially along their width.

FIGS. 13A-15B show alternative geometries where the bill path and the card path do not cross.

FIGS. 16A-17B show alternative geometries where the bill path crosses the card path such that the face of a card and a bill would be perpendicular to one another.

Figure 18A:
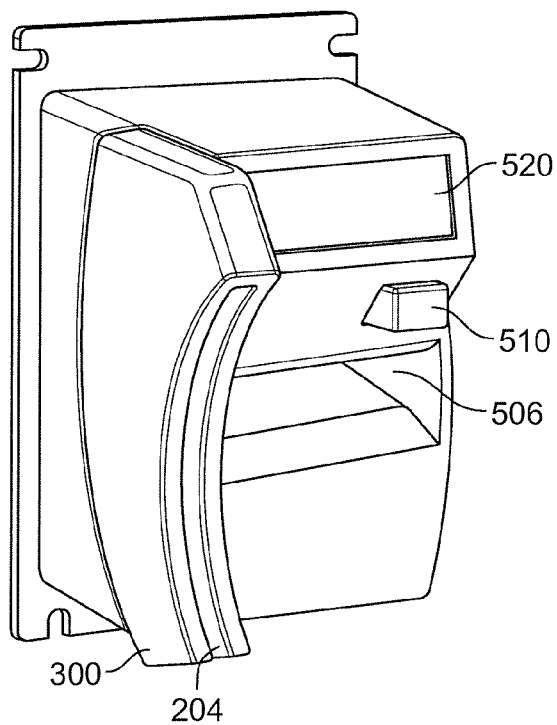
Figure 18B:
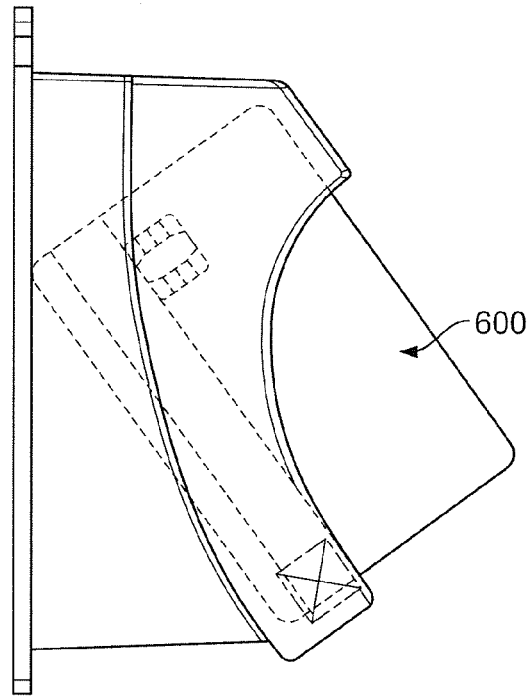
Figure 19:
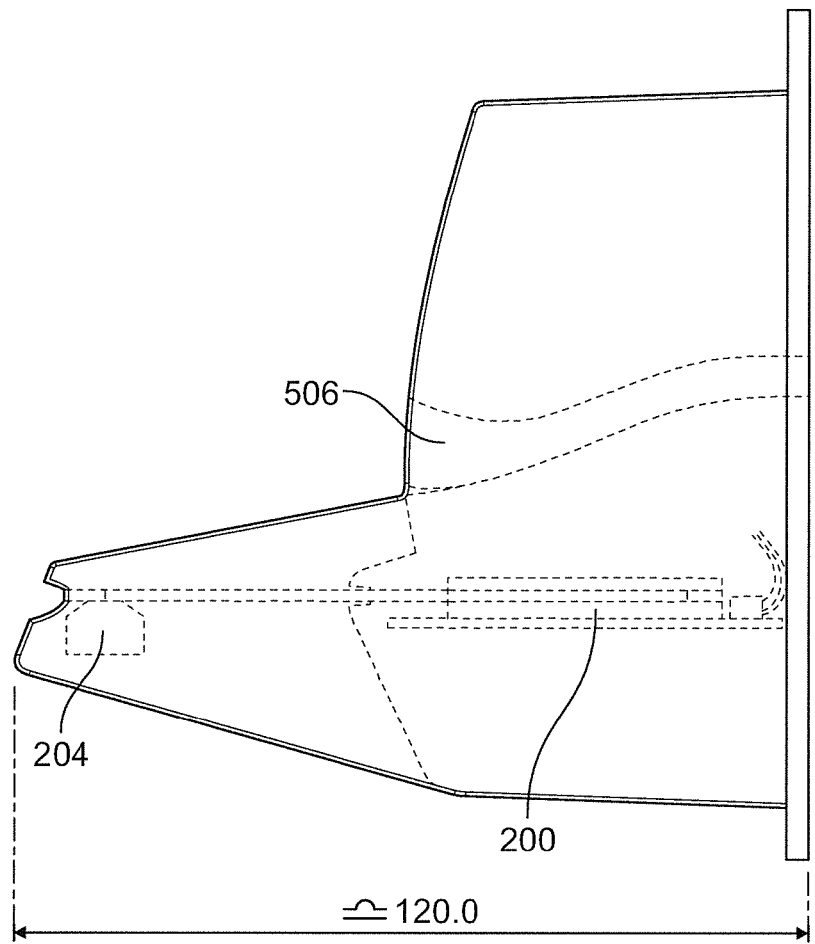

FIGS. 18A-19 show additional geometries where the card path and bill path do not cross.

Figure 20:
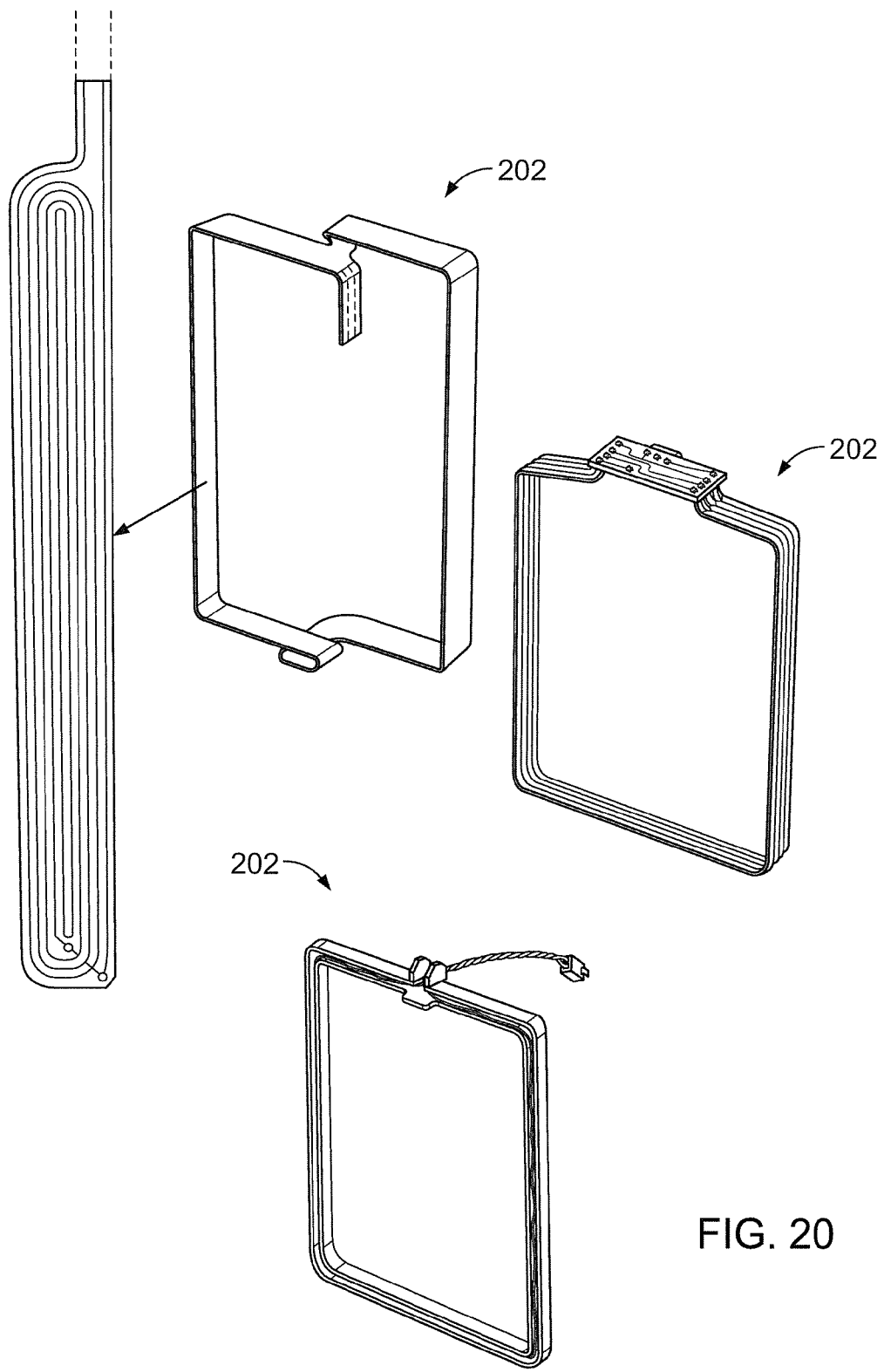
FIG. 20 illustrates various exemplary configurations of an antenna for a cardless reader in accordance with some embodiments herein.

FIG. 20 shows several embodiments of an antenna for a contactless sensor.

Figure 21A:
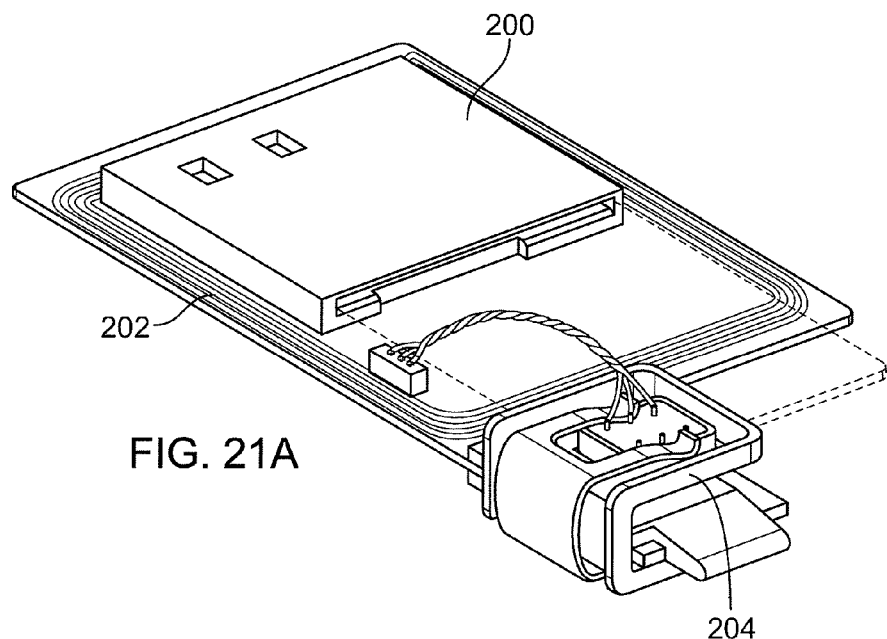
FIGS. 21A and 21B illustrate some exemplary configurations of multiple media sensors arranged and configured in accordance with some embodiments disclosed herein.
Figure 21B:
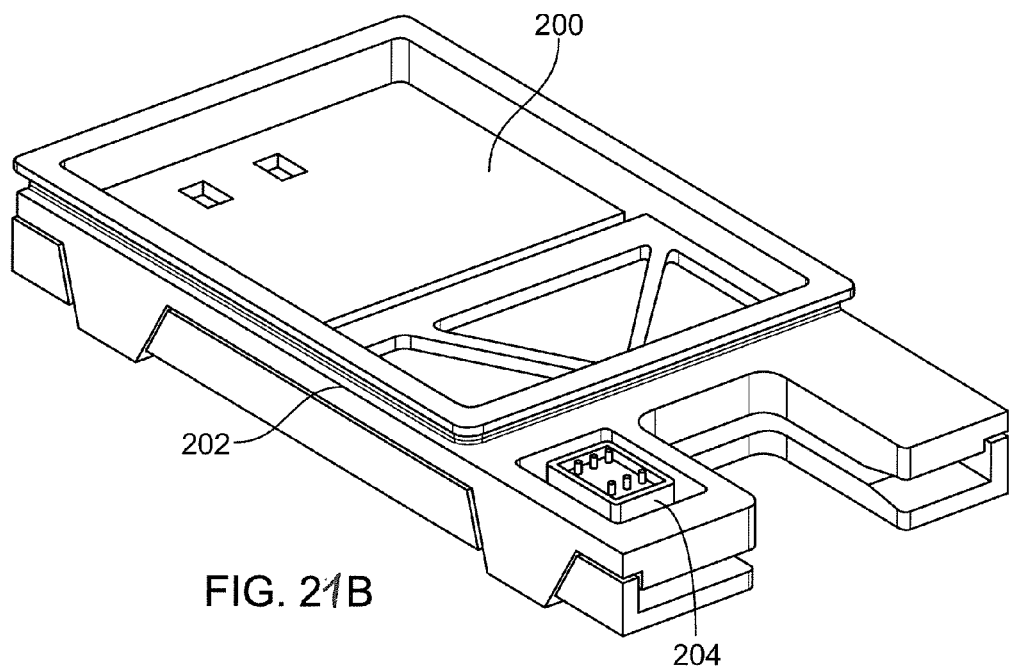

FIGS. 21A and 21B show several embodiments of arrangements for the various readers and sensors. It should be noted that these may be modular in construction for ease of repair or replacement. It also should be noted that this arrangement is suitable for hand held or stand alone units as well as for implementation into larger machines (e.g. vending, gambling, bank, etc.)

A method of determining a transaction type for transaction processing based on available media types on a standardized financial transaction card comprises:

receiving electronic data concerning available media types on the single standardized financial transaction card;

comparing, via a processor, the electronic data concerning available media types to stored instructions regarding preferential treatment of potential media types to determine a desired transaction type;

determining a desired transaction type based on the comparison;

transmitting electronic data, including desired transaction type to a transaction processor.

Although the electronic data may come from any source, it is contemplated herein that in some embodiment, prior to receiving the electronic data, the method further comprises sensing, via a plurality of media sensors, data stored on a plurality of media types on the single standardized financial transaction card, said data including which media types are present; and outputting the data as electronic data to the processor.

In some embodiments, the stored instructions comprise a hierarchical ranking of media types corresponding to the desired transaction type in an electronic form such as a database or other data structure.

An exemplary user interface, such as a bezel, is depicted throughout FIGS. 2 to 10. Like reference numerals refer to like elements throughout the drawing figures. The drawings are meant to be illustrative only, other variants of the interface will be come readily apparent in light of the drawings and disclosure herein.

Figure 6:
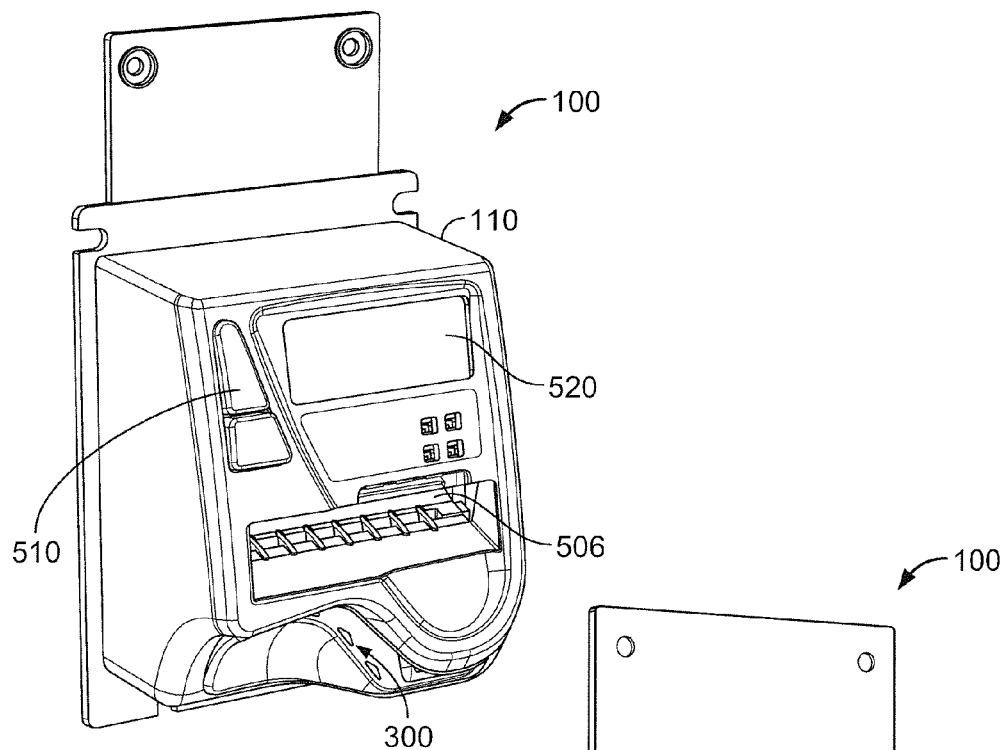

FIG. 6 shows a perspective view of a bezel useful in a vending or other transition machine. The bezel 100 includes a housing 110, a display 520, an input device 510 in the form of two user engageable keys, a bill acceptor 500, the bill path 300 is indicated with a broad arrow.

Figure 7:
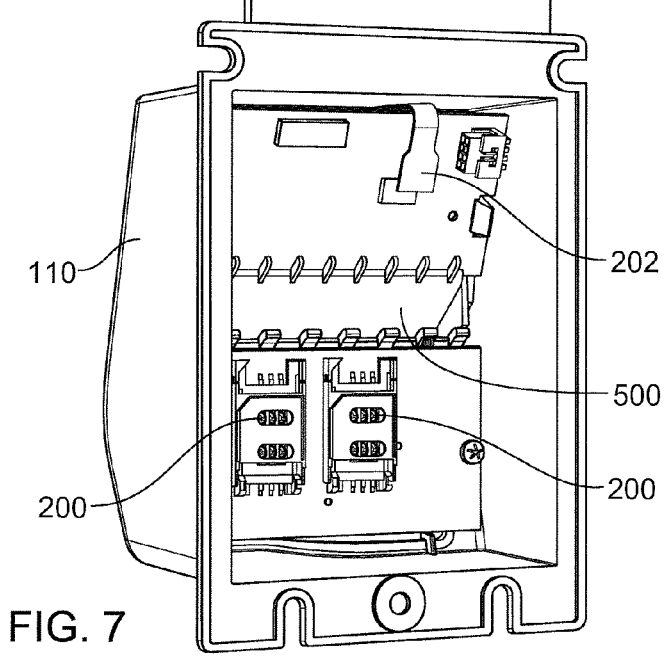
Figure 11A:
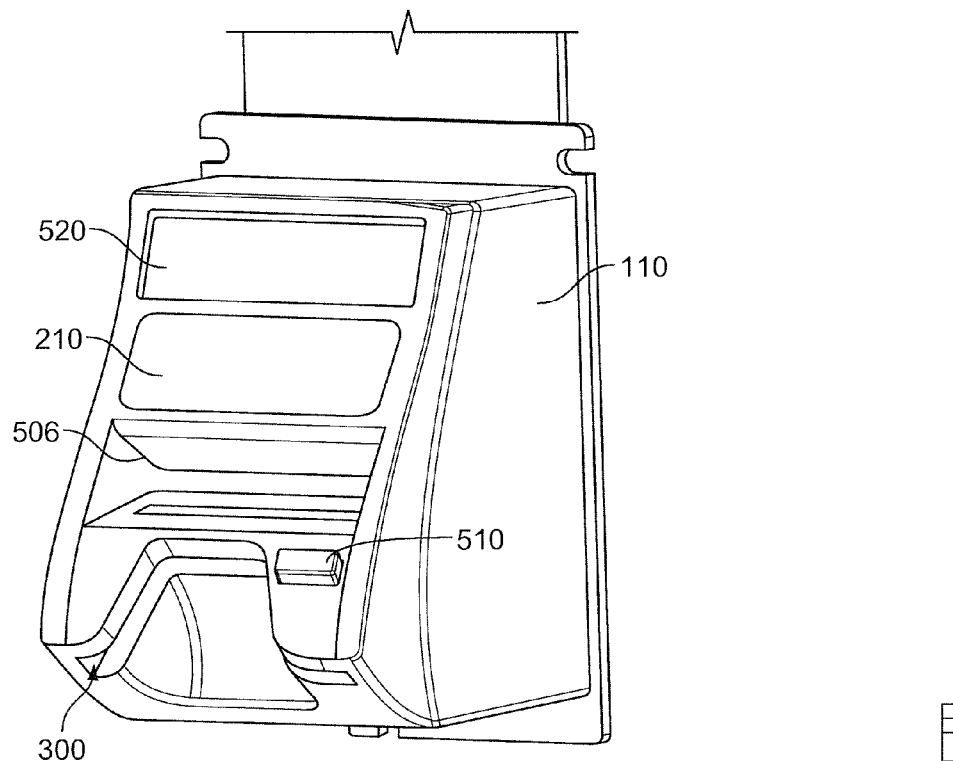
FIGS. 11A-19 are alternative geometries for a bezel or terminal in accordance with some embodiments herein.
Figure 11B:
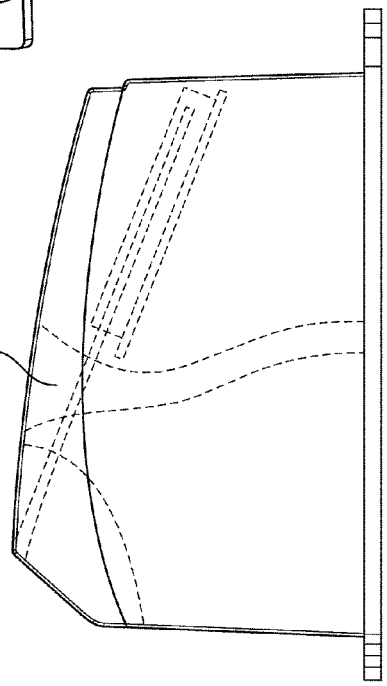
Figure 12A:
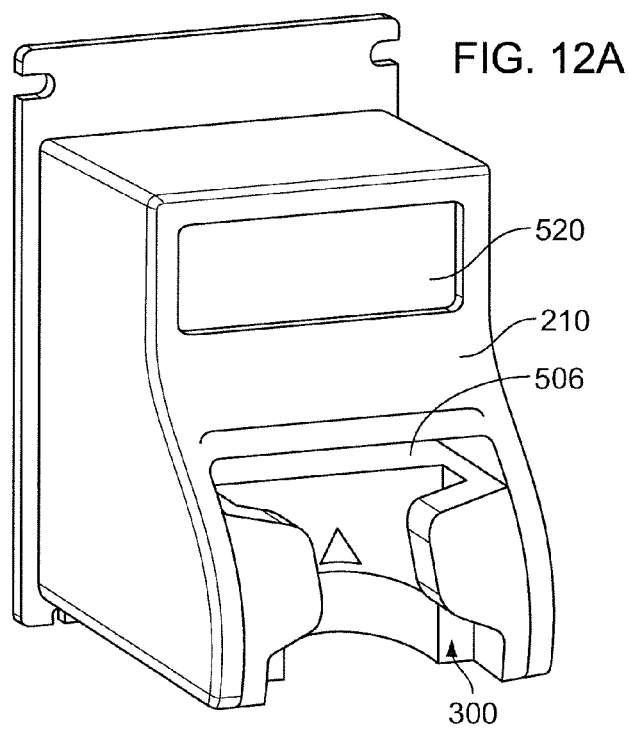
Figure 12B:
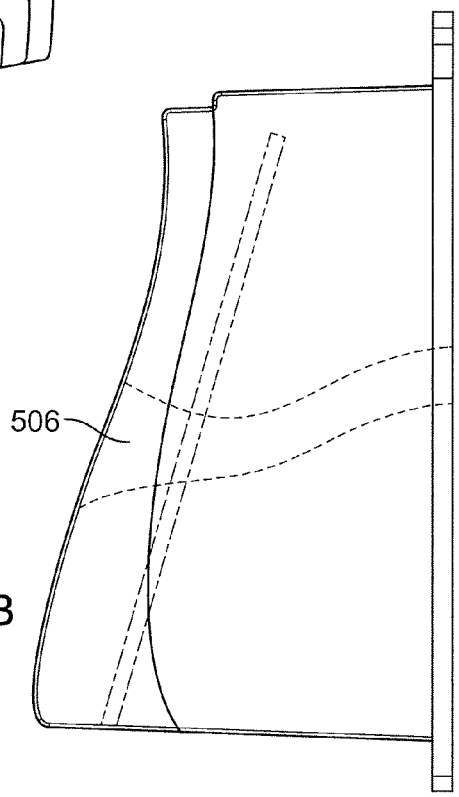
Figure 13A:
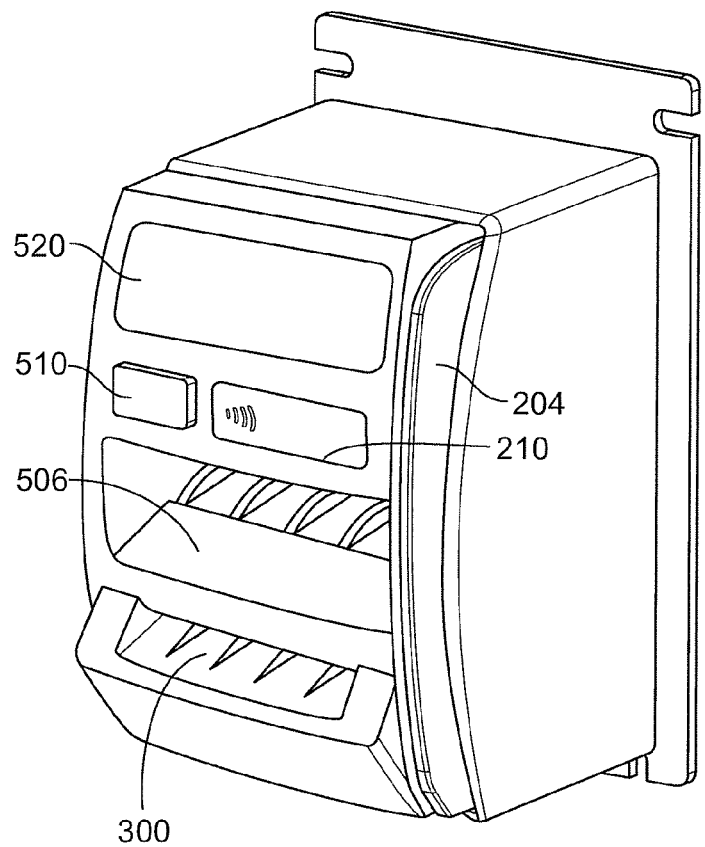
Figure 13B:
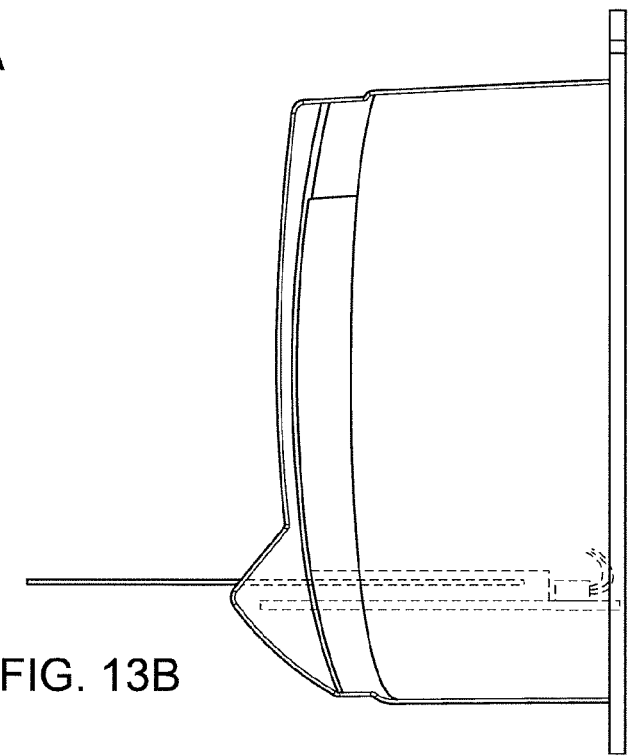
Figure 14A:
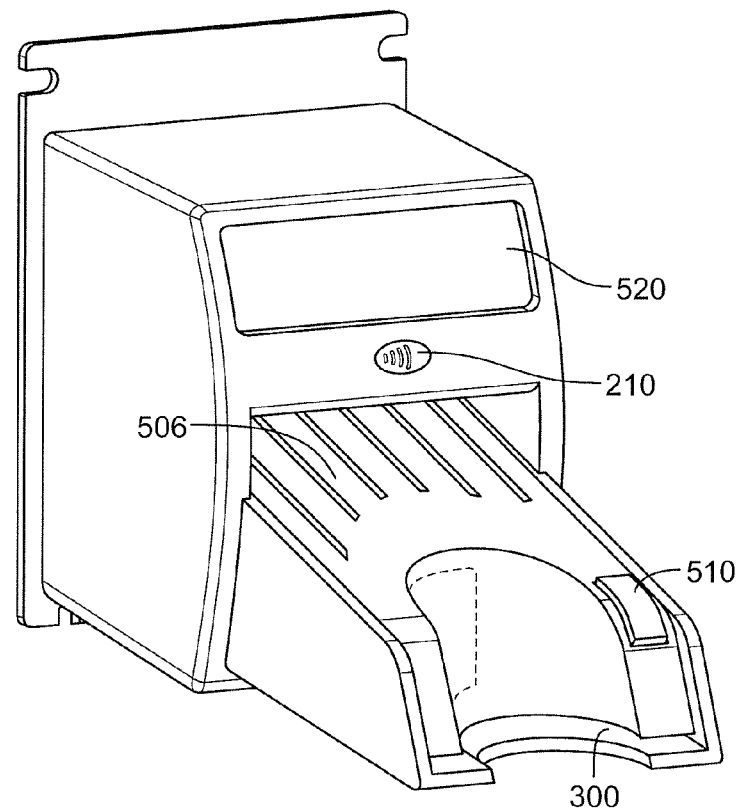
Figure 14B:
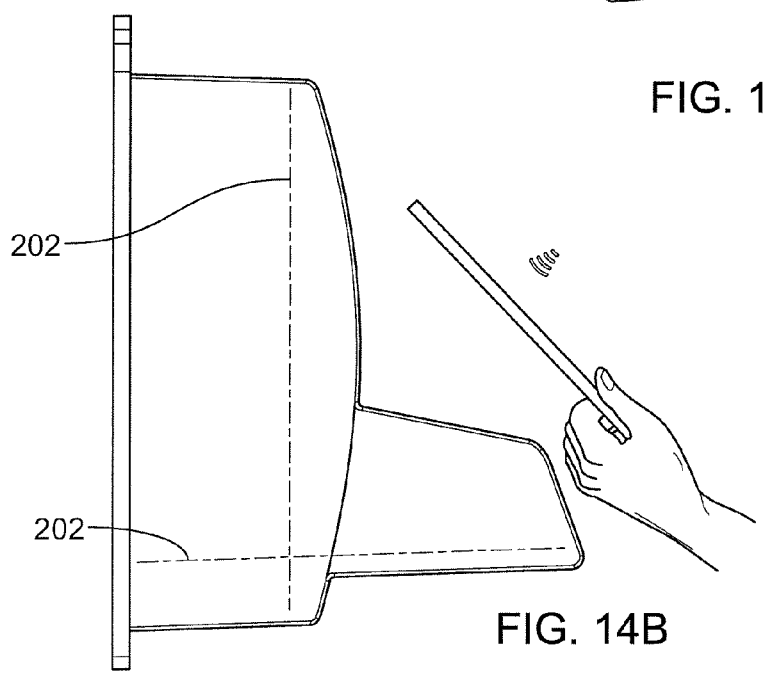
Figure 15A:
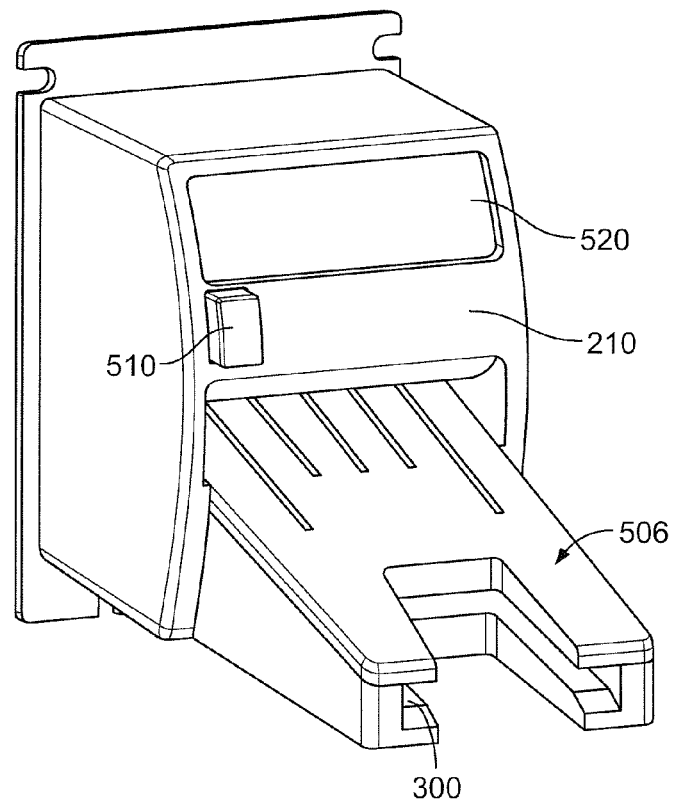
Figure 15B:
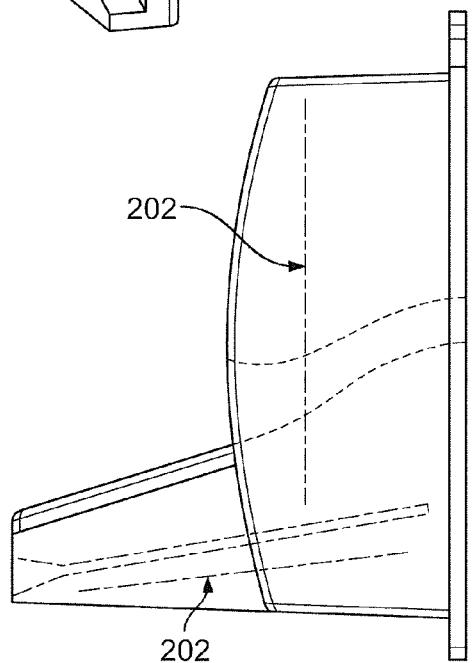
Figure 16A:
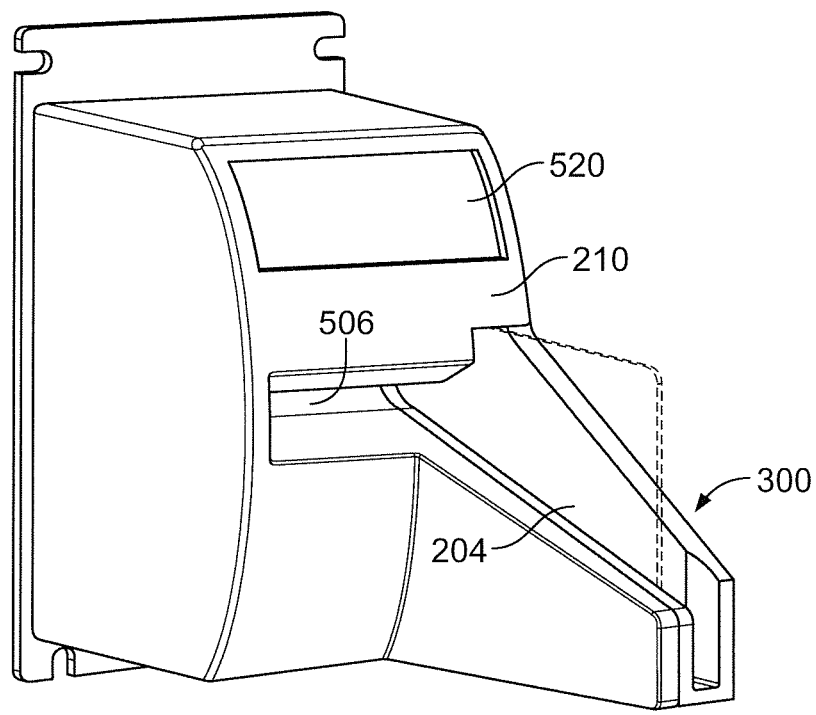
Figure 16B:
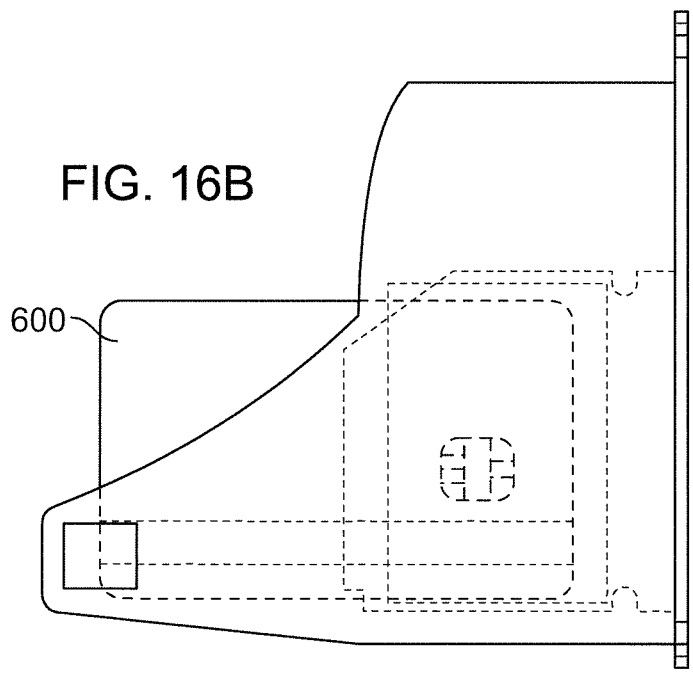
Figure 17A:
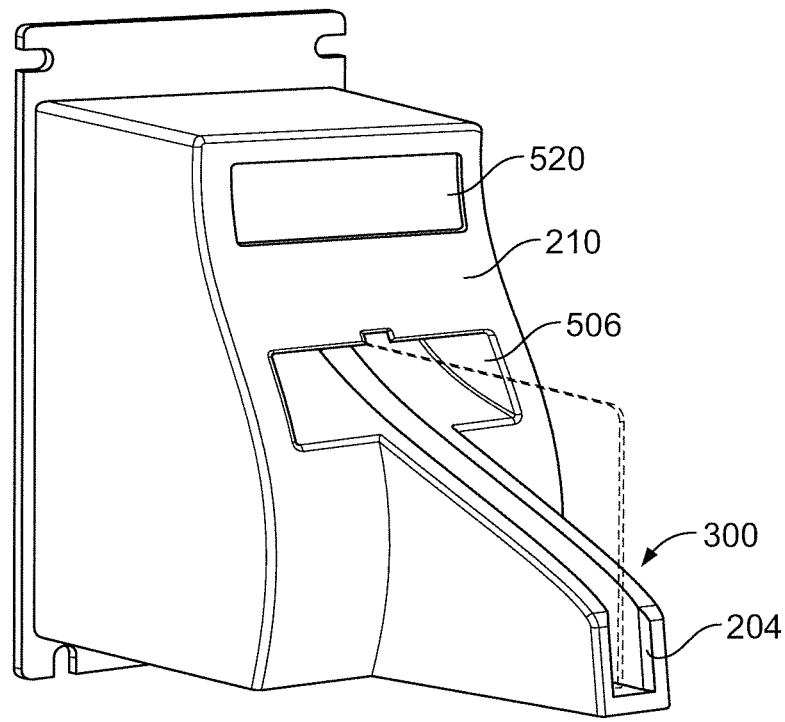
Figure 17B:
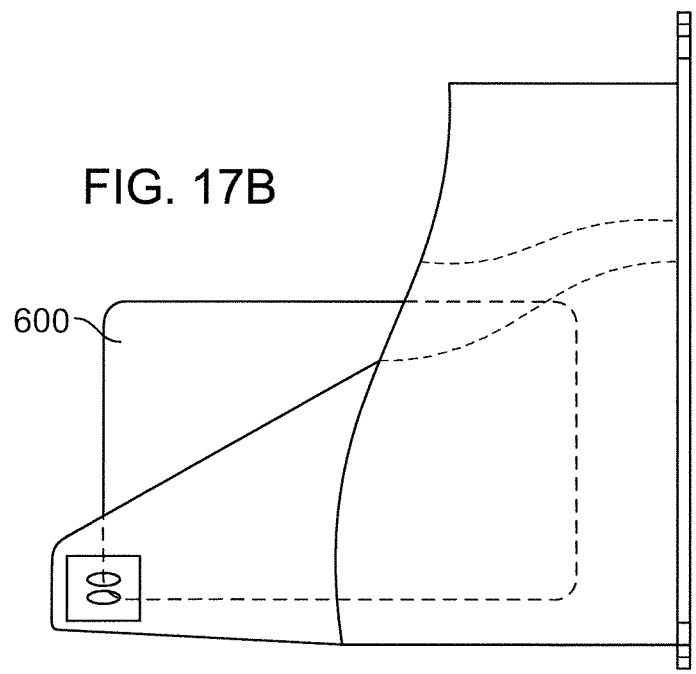

FIG. 7, shows a rear perspective view. In this view, some internal workings can be seen. The bezel 100 includes housing 110, which houses various carrier platforms for the media sensors 200, including in this embodiment and RF sensor loop, 202. The bill acceptor 500 is also seen. In the embodiment shown, the card bath crosses the bill path. In such embodiments, mean may be employed to ensure that a bill and a card cannot be inserted simultaneous. Such means may be a physical means or perhaps software means whereby one of the two paths becomes inoperable.

FIG. 8 shows an exploded perspective view of the bezel. Throughout, it can be seen that the housing 110 provides support for various platforms which in turn support the media sensors. Importantly, inner portions 250 and 255, define a singular card path 300. The media sensors 200 are placed strategically about the singular card path such that each media sensor is in a position complimentary to the standard position on a standardized financial transaction card for a particular media type.

The housing 110 encapsulates and secures the various parts either directly or indirectly. Inner portion 250 and 255 combine, among other things, to define a singular card path 300 denoted by the broad arrow. In this view, one can see a magnetic stripe reader 204, which is appropriately placed along the path in what would correspond to a magnetic stripe's position on a bank card. A display screen 520 and interface 510 in the form of keys is also shown. An RF loop 202 is provided as media sensor for RF and other contact/contactless operations. Additional media sensors 200 are appropriately located and housed in a compact but effective package. Various parts such as inner portion 250 also combine to form a bill acceptor.

FIGS. 9 and 10 show some possible arrangements for various electronics, including additional media sensors. Depending on the sensors used, the particular space requirements of the vending machine, and other factors, the design, orientation, and layout could differ.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "comprises" should be interpreted as "includes but is not limited to," etc.)

It should also be understood, that although various compounds, compositions, methods, and devices are described in "open" terms of "comprising," "including," or "having" various components or steps (interpreted as meaning "including, but not limited to"), the compounds, compositions, methods, and devices can also "consist essentially of" or "consist of" the various components and steps, and such terminology should be interpreted as defining essentially closed-member groups. This paragraph is not meant in any way to limit the meaning of "comprising", "having," or "including" (and other verb forms thereof), which are to be interpreted as open-ended phrases meaning "including but not limited to" consistent with patent law and custom. The intent of this paragraph is merely to indicate that the closed-member groups defined by the "consisting of" or "consisting essentially of" language are lesser included groups within the open-ended descriptions and to provide support for claims employing the "consisting of" or "consisting essentially of" language.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A payment interface system, the system comprising:
   a. a user interface further comprising:
      i. a housing,
      ii. a plurality of media sensors for sensing card data and media type, the plurality of media sensors each being selected to read a different media type,
      iii. a singular card path for guiding a standardized financial transaction card having card data stored on at least one media type,
      each media sensor is positioned and located within the housing and along the singular card path such that user action of inserting a standardized financial transaction card into and along the singular card path places each media type present on the card in operative communication with a corresponding media sensor,
   and
   b. a transaction type controller further comprising:
      i. a memory for housing a set of stored instructions regarding determining a desired transaction type to present for payment based on media type, when multiple media types are present in a single standardized financial transaction card,
      ii. a processor in communication with the plurality of media sensors for obtaining card data and media type and for implementing the stored instructions to determine the desired transaction type based on available media types on the standardized financial transaction card and the stored instructions, and capable of communicating the desired transaction type along with card data to a payment controller.

2. The payment interface system of claim 1, wherein said media sensor is selected from magnetic stripe readers, chip readers, chip and pin readers, contactless readers, prepaid card readers, RF readers, and near field communication (NFC) readers.

3. The payment interface system of claim 1, wherein at least one of said plurality of media sensors is a contact or contactless reader positioned such that contact or contactless media may be read when in operative proximity of the housing without entering the single card slot and path.

4. The payment interface system of claim 1, further comprising a communication device for communicating with the user.

5. The payment interface system of claim 4, wherein the communication device is a display device, an audio device or combination thereof.

6. The payment interface system of claim 1, further comprising a bill acceptor.

7. The payment interface system of claim 1, further comprising a user input device.

8. A payment interface system, the system comprising:
   a. a user interface further comprising:
      i. a housing, defining a single card slot and single card path for accepting a standardized financial transaction card having card data stored on at least one media type,
      ii. a plurality of media sensors, for sensing card data and media type,
      each media sensor is positioned and located within the housing such that user action of inserting a standardized financial transaction card into the single card slot and along the single card path, places each media type present on the card in operative communication with a corresponding media sensor, the plurality of media sensors are each selected from a different media type, said media type selected from magnetic stripe readers, chip readers, chip and pin readers, contactless readers, prepaid card readers, RF readers, and near field communication (NFC) readers, wherein any contact or contactless reader is also positioned such that contact or contactless media may be read when in operative proximity of the housing without entering the single card slot and path;

iii. a communication device for communicating with the user, wherein the communication device is a display device, an audio device or combination thereof, iv. a bill acceptor;

v. a user input device;

and b. a media type controller further comprising:

i. a memory for housing a set of stored instructions regarding determining a desired media type to present for payment when multiple media types are present in a single standardized financial transaction card, ii. a processor in communication with the plurality of media sensors for implementing the stored instructions to determine the desired media type based on available media types on the standardized financial transaction card and the stored instructions and capable of communicating the desired media type to a payment controller.

9. A user interface for a payment interface system comprising:

a housing, a plurality of media sensors for sensing card data and media type, the plurality of media sensors each being selected to read a different media type, a singular card path for guiding a standardized financial transaction card having card data stored on at least one media type, each media sensor is positioned and located within the housing and along the singular card path such that user action of inserting a standardized financial transaction card into and along the singular card path places each media type present on the card in operative communication with a corresponding media sensor.

10. The user interface of claim 9, wherein said media sensor is selected from magnetic stripe readers, chip readers, chip and pin readers, contactless readers, prepaid card readers, RF readers, and near field communication (NFC) readers.

11. The user interface of claim 9, wherein at least one of said plurality of media sensors is a contact or contactless reader positioned such that contact or contactless media may be read when in operative proximity of the housing without entering the single card slot and path.

12. The user interface of claim 9, further comprising a communication device for communicating with the user.

13. The user interface of 12, wherein the communication device is a display device, an audio device or combination thereof.

14. The user interface of claim 9, further comprising a bill acceptor.

15. The user interface of claim 9, further comprising a user input device.

16. A transaction type controller for a payment interface system, the transaction type controller comprising:

a memory for housing a set of stored instructions regarding determining a desired transaction type to present for payment based on media type, when multiple media types are present in a single standardized financial transaction card, a processor in communication with the plurality of media sensors for obtaining card data and media type and for implementing the stored instructions to determine the desired transaction type based on available media types on the standardized financial transaction card and the stored instructions, and capable of communicating the desired transaction type along with card data to a payment controller.

17. A method of determining a transaction type for transaction processing based on available media types on a standardized financial transaction card, the method comprising:

receiving electronic data concerning available media types on the single standardized financial transaction card;

comparing, via a processor, the electronic data concerning available media types to stored instructions regarding preferential treatment of potential media types to determine a desired transaction type;

determining a desired transaction type based on the comparison;

transmitting electronic data, including desired transaction type to a transaction processor.

18. The method of claim 17, wherein prior to receiving the electronic data, the method further comprises:

sensing, via a plurality of media sensors, data stored on a plurality of media types on the single standardized financial transaction card, said data including which media types are present;

outputting the data as electronic data to the processor.

19. The method of claim 18, wherein the stored instructions comprise a hierarchical ranking of media types corresponding to the desired transaction type.

20. The method of claim 19, wherein the media types are selected from contactless, contact, magnetic stripe.

* * * * *